April 25, 1967   P. WERNER   3,316,002
LOCKING ARRANGEMENT
Filed Jan. 6, 1965   3 Sheets-Sheet 1

INVENTOR
Paul Werner
by Michael J. Striker

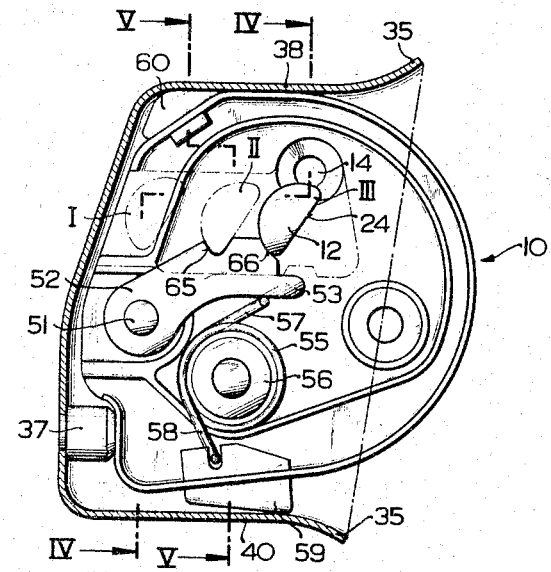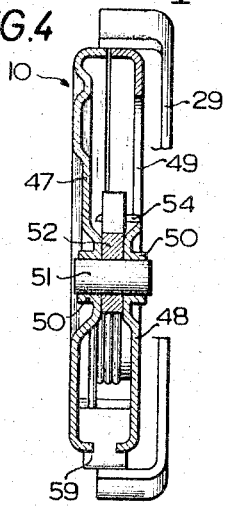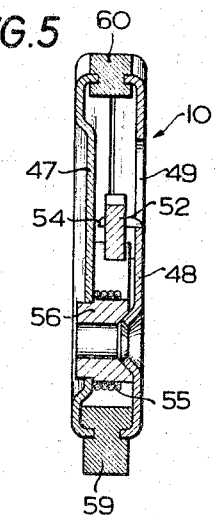

April 25, 1967 P. WERNER 3,316,002

LOCKING ARRANGEMENT

Filed Jan. 6, 1965 3 Sheets-Sheet 3

INVENTOR
Paul Werner
by
Michael J. Striker

United States Patent Office 3,316,002
Patented Apr. 25, 1967

3,316,002
LOCKING ARRANGEMENT
Paul Werner, Remscheid-Hasten, Germany, assignor to Fritz Keiper K.G., Remscheid-Hasten, Germany
Filed Jan. 6, 1965, Ser. No. 424,884
Claims priority, application Germany, Jan. 8, 1964, K 51,781
12 Claims. (Cl. 292—194)

This invention relates to a locking arrangement for a vehicle.

It has previously been proposed to provide a locking arrangement for a vehicle comprising a lock adapted to be fixed to the door, the latch thereof being in the form of a pivot projecting at right angles from the end wall of the door; a closing block adapted to be fixed to the upright of the door; and a check lever designed to pivot against the action of a spring about an axis at right angles to the casing of the upright. With such devices the lever prevents the latch, which when the door is closed enters a groove open at one end in the closing block, from moving so as to open the door. In this known closure the groove, in the closing block, which groove is open at one end, can be blocked by the check lever which is supported against the side wall of the groove. The latch or catch bolt is thus supported against the check lever and the check lever is in turn supported against the side wall of the groove. Pressure exerted on the door to open it thus acts on the lever by way of the latch and has to be taken up by the wall bounding the groove.

The present invention aims to provide a locking arrangement of the above type for a vehicle which overcomes such disadvantages. According to the invention there is provided a locking arrangement for a vehicle, comprising a lock adapted to be fixed to the door, the latch thereof being in the form of a pivot projecting at right angles from the end wall of the door; and further comprising a closing block adapted to be fixed to the upright of the door; and a check lever designed to pivot against the action of a spring-loaded plunger about an axis at right angles to the casing of the upright of the door; wherein the lever prevents the latch, which when the door is closed can enter either of two grooves, which are open at one end, in the closing block, from moving so as to open the door; wherein the door can be locked in a safety closed position or in a fully closed position and in each of these positions a bearing surface on the check lever bears against the latch, the bearing surfaces being formed by recesses which are shaped to conform with the cross section of the latch and being concentric with the point of rotation of the latter; and wherein the said bearing surfaces are in the same plane as the points of rotation of the check lever and latch.

In this way the check lever and the latch support one another in the safety closed position and the fully closed position III and no special supporting means are required for the lever.

The latch or catch bolt is preferably substantially semi-circular in cross section, and its rounded portion adapted to be applied to a similarly rounded bearing surface of the check lever, and for the flat surface to be inclined to the closing direction of the latch and to co-operate as a wedge surface with the check lever.

As a result, when the door is closed the check lever is swivelled by the surface of the latch inclined to the closing direction, until the recesses forming the bearing surfaces of the check lever snap on to the latch. In the safety closed position and the fully closed position the round portion of the latch is applied to the bearing surface of the check lever, which is rounded out with the same radius, thus providing a secure support.

It is further preferred that, in its active position, the check lever should block less than half the width of the groove in the closing block, said groove being open at one end. The door can consequently be opened by turning the approximately semi-circular latch, which can be led past the check lever.

It is also preferred for the check lever to be inserted in a slot in the closing block and be adapted to swivel about a pivot held in the closing block, and for its free end to extend into the substantially horizontal groove which is open at one end. Further, the closing block is preferably a pressure casting. Thus, the closing block is simple and cheaply made, its check lever is mounted simply and yet securely and its free end co-operates with the latch.

In a preferred embodiment, pivoting of the check lever is limited by a pin held in the closing block and engaging in an arcuate slot in the lever. This is a simple and inexpensive way of limiting the pivotal movement of the lever.

It is further preferred for the plunger acting on the check lever to be inserted in a hole in the closing block and to act on the lever by means of a spring located beneath the plunger. The spring may be a cheap helical compression one completely inserted in the hole and thus not subject to kinking.

When the door is closed it is desirable for the oblique surface of the latch, which co-operates as a wedge surface with the check lever, to strike a likewise oblique side edge of the lever. This is a simple method of ensuring that when the door is closed the check lever is swivelled against the action of its associated spring by the impact of the latch.

The block desirably comprises two flat, embossed or stamped casing halves of which one contains a recess into which the latch can be inserted when the door is closed, wherein the check lever co-operates with the latch, is arranged between the two halves of the casing and is mounted at one end for pivotal movement about a pivot held in bearings integral with the casing halves, and wherein the free end of the lever extends into the recess. The resultant block is simple and cheap to produce and its check lever can be mounted between the halves of the casing in a simple manner.

It is still further preferred for the check lever to have a projection co-operating with an inwardly directed stop, integral with the edge bounding the recess, to limit the pivotal movement of the lever. This is a cheap way of providing a stop for the lever so that when the door is opened the lever cannot be swung beyond its active position.

It is further preferred for the check lever to be urged into its blocking position by a spring in the form of a buffer or volute spring and which is adapted to be wound about a bush also acting as a fastening hole with the second limb of the spring acting on a clamping wedge provided on the closing block. This makes the manufacture of the block far more simple and economical, since only one spring is used for the check lever and clamping wedge.

The check lever is desirably hooked, and its two blocking teeth, which are formed between the recesses in said check lever and which move behind the latch in the safety closed position and fully closed position, block slightly more than half the width of the recess in the closing block. The teeth of the lever consequently engage behind the point of rotation of the latch so that the latter is securely supported.

It is an advantage for the latch co-operating with the hooked check lever to be approximately segmental in cross section. This means that the door can be opened by turning the latch, the segmental sectional surface of the latch being led past the teeth of the lever.

The invention will now be further described with reference to the accompanying drawings, in which:

FIG. 3 shows a second example of the locking arrangement according to the invention with the cover removed;

FIG. 4 is a section taken along the line IV—IV in FIG. 3;

FIG. 5 is a section taken along the line V—V in FIG. 3;

Figure 1:
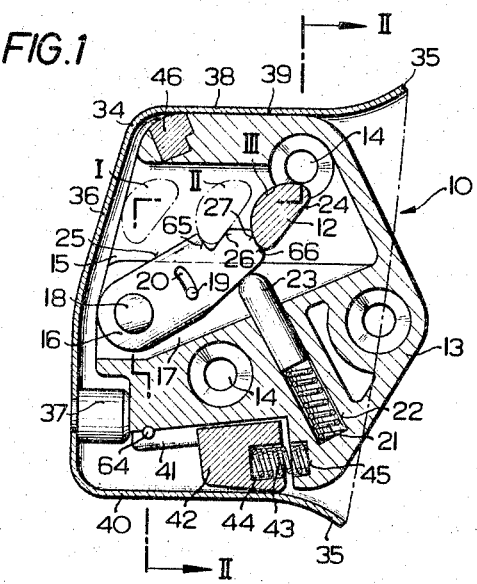
FIG. 1 is a section through a locking arrangement according to one example of the invention.

The locking arrangement according to the invention comprises a closing block 10 which is adapted to be fixed to the upright of the door and a lock 11 adapted to be fixed to the door itself, the catch bolt 12 of the lock co-operating with the block 10. In the example illustrated in FIGS. 1 and 2 the closing block is a pressure cast member 13 containing holes 14 for fastening screws (not shown). The pressure cast member 13 contains a substantially horizontal groove 15 which is open at one end and in which the catch bolt 12 engages when the door is closed. The catch 12 is held in the groove 15 by a check lever 16 which is inserted in a slot 17 in the member 13 and which is adapted to swivel about a pivot 18 held in the member 13. In its working position the check lever 16 blocks less than half the width of the groove 15 in the block 10. The ability of the lever 16 to pivot is restricted by a pin 19 held in the member 13 engaging through an arcuate slot 20 in the lever 16. The lever 16 is held in its blocking position by a plunger 23 located in a hole 22 in the member 13 and urged against the lever 16 by a spring 21 in the hole 22.

As can be seen particularly from FIG. 1, the catch 12 is of semi-circular cross section. FIG. 1 shows the catch in three positions I, II and III in relation to the closing block 10. Position I corresponds to the open position of the door, where the catch 12 does not yet have a working connection with the check lever 16 of the block 10. On closing the door the oblique surface 24 of the catch 12 drops onto the side edge 25 of the check lever 16, which is inclined to the direction of movement of the catch 12, so that the lever 16 is turned about its pivot 18 against the action of the spring-loaded plunger 23 until the recess 26 in the lever 16 snaps onto the catch 12. In this position (II), the catch 12 is in the so-called safety closed position. On further closing of the door the lever 16 is again pivoted against the action of the spring-loaded plunger until the second recess 27 in the lever 16 moves behind the catch 12. The door is now in its fully closed position (III).

In the safety closed position II and the fully closed position III the round portion of the catch 12 is supported against the bearing surfaces 65, 66 formed by the recesses 26, 27. The bearing surfaces are shaped to conform with the cross section of the catch, are concentric with the point of rotation thereof, and are on one line with the points of rotation of the check lever and catch. In this way the check lever and the catch support one another in the safety closed position II and the fully closed position III.

Figure 2:
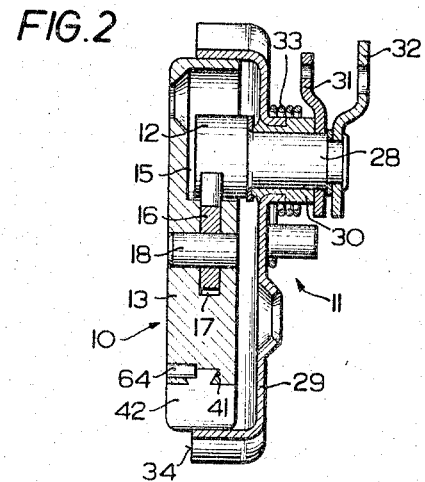
FIG. 2 is a section taken along the line II—II in FIG. 1.

In the example illustrated in FIGS. 1 and 2 the door is opened by turning the catch 12. For this purpose the catch is held against a cylindrical trunnion 28 rotatably mounted in a bush 30 provided on a plate 29 for the block 10.

At the end remote from the catch 12 the cylindrical trunnion 28 has two levers 31 and 32 with which the catch 12 can be pivoted against the action of a spring 33 by internal and external handles known per se (not shown). The catch 12 could alternatively be designed for displacement, i.e. to be drawn into the plate 29, so that the door would be opened by pulling the catch 12 laterally out of the recess 26 or 27 in the lever 16.

The plate 29 is provided with a substantially U-shaped edging 34 directed against the frame of the door supporting the closing block 10. When the door is closed the plate 29 with its edging is pressed onto the block 10 and the closed door thus prevented from rattling and clattering. The ends 35 of the edging are arranged in a funnel shape so as to facilitate pressing them onto the block 10 when the door is closed. The front edges of the block 10 are likewise rounded and the rounded portions may be reinforced with inserts 46 of wear-resistant material. The plate 29 with the edging 34 is thus pressed onto the block 10 until the catch 12 adopts its closed position and the plate 29 strikes against the block 10 by means of a buffer 37 provided at the crest 36 of its U-shaped edging 34. The limb 38 of the U-shaped edging 34 lies on the top surface 39 of the block 10 in this position, while the limb 40 is applied to the underside. A clamping wedge 42 is provided in a dovetail guide 41 in the underside of the block 10, the guide 41 extending at a slight inclination to the limb 40 of the U-shaped edging so that the clamping wedge 42, which is acted on by a spring 43, can be set to a position in which it bears against the limb 40, the setting depending on the distance the two limbs 38 and 40 of the U-shaped edging 34 are spaced apart. The block 10 is thus positively seated in the edging 34 so as to compensate for manufacturing tolerances and wear. The spring 43 acting on the wedge 42 is inserted at one end in a hole 44 in the wedge 42 and at the other in a hole 45 in the block 10. The wedge 42 is prevented from sliding off the end of the dovetail guide 41 by a pin 64.

In the example illustrated in FIGS. 3 to 5, the catch 12 and plate 29 correspond to the example illustrated in FIGS. 1 and 2. Like members bear like references. The block 10, however, comprises two flat embossed casing halves 47 and 48. The half 48 contains a recess 49 into which the catch 12 is inserted when the door is closed. As can be seen particularly from FIG. 4, the two halves 47, 48 of the housing are each integral with a bearing 50 in which a pivot 51 for a check lever 52 is mounted. The lever 52 co-operates with the catch 12 in the same manner as the check lever 16 and the check lever 52 has a projection 53 co-operating with an inwardly directed stop 54 integral with the edge bounding the recess 49. A buffer or volute spring 55 is wound about a bush 56 which also has a hole for one of the fastening screws. One limb 57 of the spring holds the check lever 52 in its working position and the other limb 58 acts on a clamping wedge 59 guided between the opposite edges of the casing halves 47, 48. The clamping wedge 59 co-operates with the edging 34 of the lock plate 29 in the same manner as the wedge 43 in the example illustrated in FIGS. 1 and 2. An insert 60 of wear-resistant material, which again co-operates with the edging 34 of the plate 29, is fitted between the opposite edges of the casing halves 47, 48 and the latter are held together by fastening screws (not shown).

Figure 6:
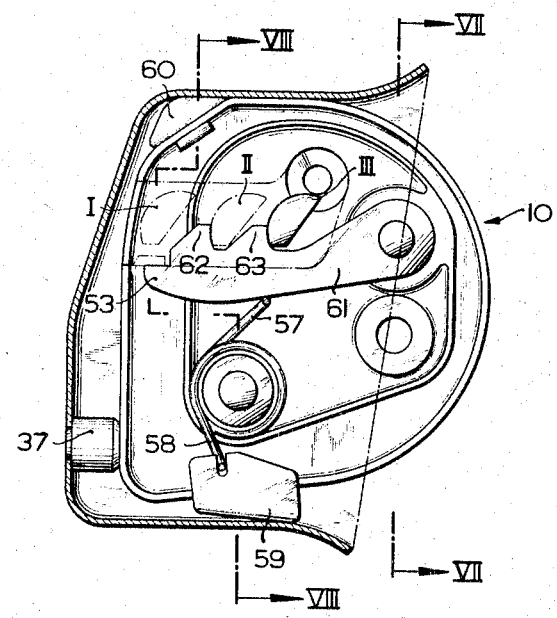
FIG. 6 shows a third example of the locking arrangement according to the invention with the cover removed.
Figure 7:
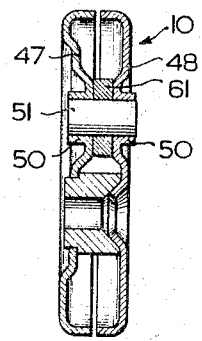
FIG. 7 is a section along the line VII—VII in FIG. 6.
Figure 8:
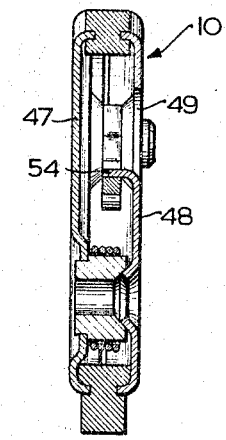
FIG. 8 is a section along the line VIII—VIII in FIG. 6.

The example illustrated in FIGS. 6 to 8 substantially corresponds to that illustrated in FIGS. 3 to 5. However, the check lever, in this case 61, is hooked and has two blocking teeth 62, 63 which move behind the catch 12 in the safety closed position II and fully closed position III. For this purpose the catch 12, which is substantially segmental in section, is somewhat flattened on the underside. Thus, in this example the check lever 61 is loaded in tension, whereas in the first two examples the levers 16 and 52 were loaded in compression.

As previously mentioned, the invention is not restricted to the examples illustrated. Many other constructions and applications are possible without departing from the spirit and scope of the invention. For example, half of the closing block could be formed by a pressure cast member closed with a cover stamped out of sheet metal. The closing block could likewise be formed from two pressure cast members.

I claim:

1. A locking arrangement for a door, especially a vehicle door, comprising, in combination, a lock adapted to be fixed to the door and including an elongated latch having a longitudinal axis extending at right angles to the door, said latch being turnable about said axis and projecting with an end portion thereof beyond the door so that said end portion moves during closing of the door along a predetermined path; support means adapted to be mounted on the door frame; a check lever; pivot means defining a pivot axis substantially parallel to a plane in which said longitudinal axis of said latch moves during closing of said door and mounting said check lever in the region of one end thereof on said support means tiltable about said pivot axis between an active and an inactive position, said lever having a portion spaced from said tilting axis and located in said active position of said lever in said path, said portion of said lever being provided with a pair of bearing surfaces spaced from each other in direction of said path and adapted to engage, respectively, with said end portion of said latch during closing movement of said door, said bearing surfaces being constructed and arranged to prevent, when engaged by said portion of said latch, opening of said door and so that a plane including said longitudinal axis of said latch and said pivot axis passes through a portion of the respective bearing surface engaged by said latch; and biasing means connected to said check lever and biased so as to yieldably maintain the latter in said active position.

2. A locking arrangement as defined in claim 1, wherein said end portion of said latch has a substantially semi-circular cross-section and a peripheral surface coaxial with said longitudinal axis, and wherein each of said bearing surfaces is a cylindrical surface having substantially the same radius as said peripheral surface.

3. A locking arrangement as defined in claim 1, wherein said support means is in the form of a block formed with a groove extending in direction of said path and having a given width, said portion of said check lever projecting into said groove, and including limiting means co-operating with said lever and limiting movement thereof into said groove under the influence of said biasing means so that said lever in its active position will block less than half of said width of said groove.

4. A locking arrangement as defined in claim 3, wherein said lever is formed with a slot having opposite closed ends and wherein said limiting means includes a pin fixed to said block and extending into said slot.

5. A locking arrangement as defined in claim 4, wherein said slot is an arcuate slot coaxial with said tilting axis.

6. A locking arrangement as defined in claim 1, wherein said biasing means comprises a plunger guided in said support means so as to be movable in direction transverse to said check lever, and spring means co-operating with said plunger for pressing one end thereof against said lever.

7. A locking arrangement as defined in claim 3, wherein said block is formed with a blind bore extending transverse to said groove, and wherein said biasing means include a plunger slidably guided in said bore, and a compression coil spring abutting with one end thereof against the closed end of said blind bore and with the other end thereof against one end of said plunger for pressing the other end of the latter against said lever.

8. A locking arrangement as defined in claim 1, wherein said support means includes two casing halves and bearings integral therewith, at least one of said casing halves being formed with a recess into which said end portion of said latch moves during closing of said door, said pivot means being mounted in said bearings and said check lever being arranged between said casing halves with said portion of said check lever extending in said active position of the latter into said recess.

9. A locking arrangement as defined in claim 8, and including a stop integral with an edge bounding said recess, and a projection on said check lever co-operating with said stop to limit pivotal movement of said lever.

10. A locking arrangement as defined in claim 8, wherein said casing halves are formed with aligned openings arranged transversely spaced from said bearings, and including a bushing between said casing halves and aligned with said openings so that fastening means for fastening said casing halves may be extended through said openings and said bushing, and wherein said biasing means includes a volute spring wound about said bushing and having a projecting limb engaging said check lever for yieldably maintaining the latter in said active position.

11. A locking arrangement as defined in claim 10, and including a clamping wedge carried by said casing halves, said spring having a second limb engaging said clamping wedge for clamping the latter, when said door is in closed position, against a surface of said lock.

12. A locking arrangement as defined in claim 1, wherein said check lever is provided with a pair of teeth, said bearing surfaces respectively forming a flank face of each tooth.

References Cited by the Examiner

UNITED STATES PATENTS

| 922,675 | 5/1909 | Day | 292—341.17X |
|---|---|---|---|
| 1,663,300 | 3/1928 | Halper | 292—341.17 |
| 2,665,577 | 1/1954 | Sanowskis | 292—220 |
| 3,171,680 | 3/1965 | Pugh | 292—341.12 |
| 3,233,931 | 2/1966 | Peras | 292—341.17 X |

FOREIGN PATENTS 355,539  8/1931  Great Britain.

MARVIN A. CHAMPION, *Primary Examiner.*

RICHARD E. MOORE, *Examiner.*